United States Patent
Su et al.

(10) Patent No.: US 6,178,740 B1
(45) Date of Patent: Jan. 30, 2001

(54) TURBO FAN ENGINE NACELLE EXHAUST SYSTEM WITH CONCAVE PRIMARY NOZZLE PLUG

(75) Inventors: Michael W. Su; Steve D. Podleski; Thomas A. Gally; Sean A. Newsum, all of Seattle, WA (US)

(73) Assignee: The Boeing Company, Seattle, WA (US)

( * ) Notice: Under 35 U.S.C. 154(b), the term of this patent shall be extended for 0 days.

(21) Appl. No.: 09/257,408

(22) Filed: Feb. 25, 1999

(51) Int. Cl.$^7$ .......................................................... F02K 3/02
(52) U.S. Cl. ....................................... 60/226.1; 239/265.19
(58) Field of Search ................................. 60/226.1, 262; 239/265.19, 265.23; 181/213

(56) References Cited

U.S. PATENT DOCUMENTS

| | | | |
|---|---|---|---|
| 3,693,880 | * 9/1972 | Versaw et al. ..................... | 239/127.3 |
| 3,910,375 | 10/1975 | Hache et al. ............................ | 181/33 |
| 4,142,365 | * 3/1979 | Sargisson et al. ...................... | 60/204 |
| 4,199,936 | * 4/1980 | Cowan et al. ......................... | 60/226.1 |
| 4,226,297 | 10/1980 | Cicon ................................... | 181/213 |
| 4,280,587 | 7/1981 | Bhat ..................................... | 181/213 |
| 4,288,984 | 9/1981 | Bhat et al. .............................. | 60/262 |
| 4,298,089 | * 11/1981 | Birch et al. ........................... | 181/213 |
| 4,422,524 | 12/1983 | Osborn ................................. | 181/215 |
| 4,501,393 | 2/1985 | Klees et al. ....................... | 239/265.13 |
| 4,577,462 | * 3/1986 | Robertson ............................. | 60/262 |
| 4,909,346 | 3/1990 | Torkelson ............................ | 181/213 |
| 5,222,359 | * 6/1993 | Klees et al. ............................ | 60/204 |
| 5,402,963 | 4/1995 | Carey et al. ............................. | 244/1 |
| 5,638,675 | 6/1997 | Zysman et al. ......................... | 60/262 |
| 5,706,651 | 1/1998 | Lillibridge et al. ..................... | 60/262 |
| 5,722,233 | 3/1998 | Nikkanen et al. ...................... | 60/262 |
| 5,755,092 | 5/1998 | Dessale et al. ......................... | 60/262 |
| 5,779,150 | 7/1998 | Lidstone et al. ................. | 239/265.13 |
| 5,924,632 | * 7/1999 | Seiner et al. ..................... | 239/265.19 |

* cited by examiner

*Primary Examiner*—Charles G. Freay
*Assistant Examiner*—Robert Z. Evora
(74) *Attorney, Agent, or Firm*—Brooks & Kushman P.C.

(57) ABSTRACT

A turbo fan engine nacelle houses an engine which forces engine exhaust through a primary nozzle and a fan nozzle positioned along a common central axis. The primary nozzle is bordered interiorly by a primary nozzle plug and bordered exteriorly by a primary nozzle sleeve. The fan nozzle is bordered interiorly by a core cowl and bordered exteriorly by a fan nozzle sleeve. The primary nozzle plug includes a generally cone shaped outer surface which is concave when viewed in side elevation. The concave outer surface has a radius of curvature ($R_c$). The core cowl has a distal end which is radially spaced from the outer surface of the primary plug by a distance ($\Delta H$) in a direction perpendicular to the central axis. The primary nozzle plug and core cowl define a ratio $R_c/\Delta H$ between approximately 14 and 18. The distal end of the core cowl has a core cowl radius $R_p$ with respect to the central axis. A discharge end of the fan nozzle sleeve has a fan nozzle sleeve radius $R_f$, wherein a ratio $R_p/R_f$ is between approximately 0.4 and 0.6. The outer surface of the primary plug forms a primary plug angle $\phi_p$ between approximately 13° and 19° with respect to the central axis at the primary nozzle exit. The proper scaling of these key dimensions thereby defines a primary nozzle which reduces the shock associated noise of the turbo fan engine.

10 Claims, 3 Drawing Sheets

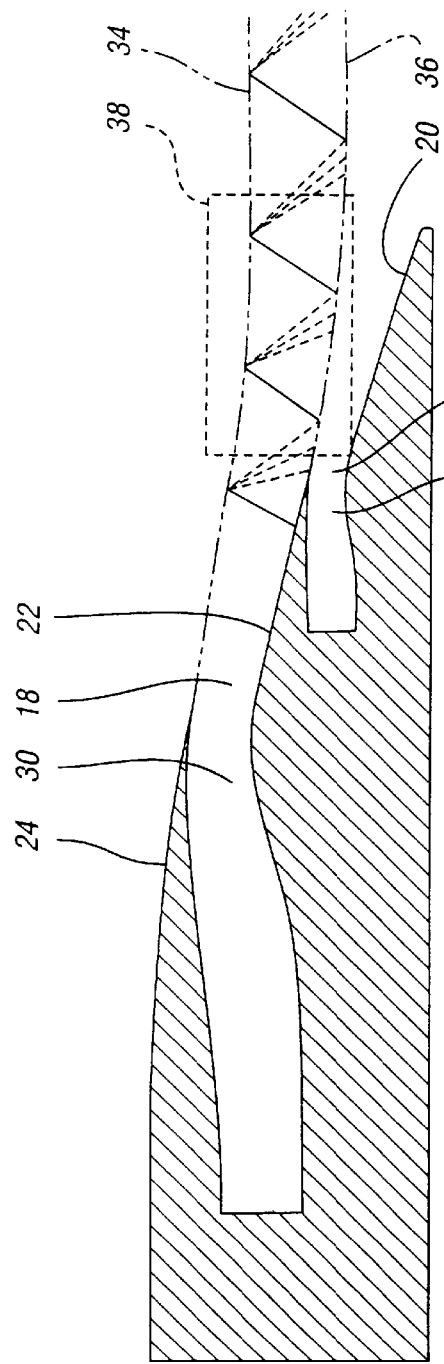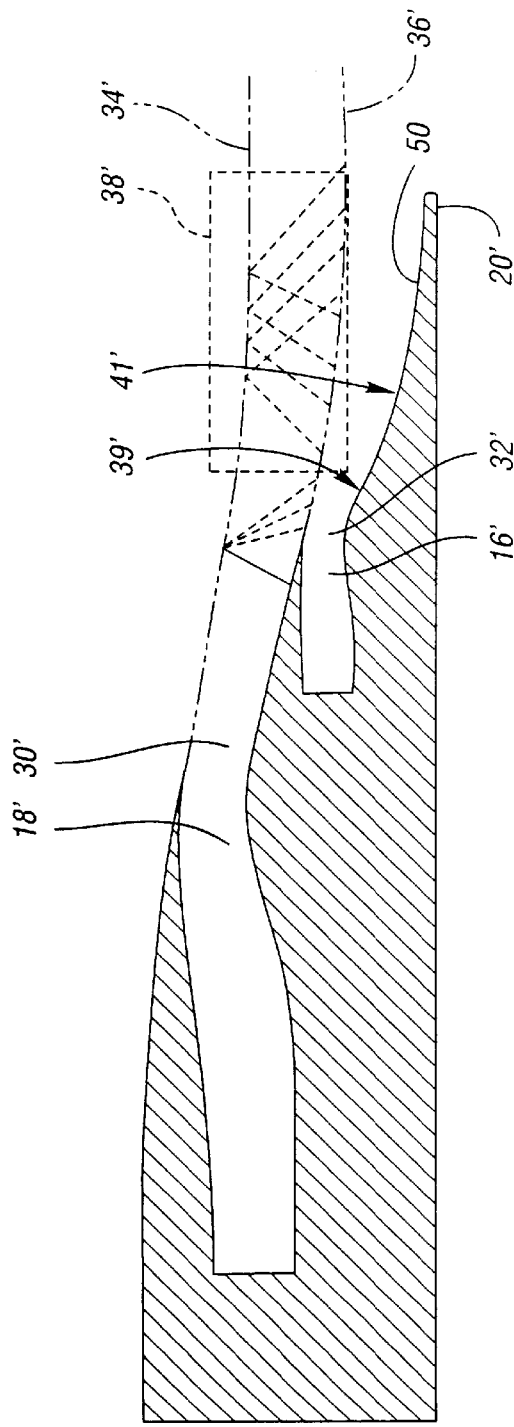

PRESSURE (P) ALONG PLUME CENTERLINE (ENGINE EXHAUST)

US 6,178,740 B1

TURBO FAN ENGINE NACELLE EXHAUST SYSTEM WITH CONCAVE PRIMARY NOZZLE PLUG

BACKGROUND OF THE INVENTION

1. Field of the Invention

The present invention relates to a turbo fan engine nacelle exhaust system having a concave primary nozzle plug for reduced shock associated noise.

2. Background Information

Referring to FIGS. 1, 2 and 3, a prior art turbo fan engine nacelle 10 is shown. In FIG. 1, the prior art turbo fan engine nacelle 10 is shown attached to a wing 12 of an aircraft. As shown in FIG. 2, the turbo fan engine nacelle 10 houses an engine 11 including a fan 14 which draws air through inlet 15, and forces the air to be exhausted through a primary nozzle 16 and fan nozzle 18. The primary nozzle 16 is bordered interiorly by the primary nozzle plug 20, and bordered exteriorly by the primary nozzle sleeve 23. The fan nozzle 18 is bordered interiorly by a core cowl 22, and bordered exteriorly by a fan nozzle sleeve 24. Accordingly, the engine 11 forces exhaust through the primary nozzle 16 and fan nozzle 18, and as shown in FIG. 1, the imperfectly expanding supersonic flow 26 exhausted from the turbo fan engine 11 interacts with turbulent air structures from the jet and creates a dominant "shock cell" noise producing region 28 which radiates sound waves 29 to the cabin, thereby producing undesirable aircraft cabin noise.

Referring to FIG. 3, the shock cell structure in the exhaust plume of an engine is the result of two flow features: (1) a compression of the secondary (fan) flow 30 on the aft section of core cowl 22 and the resulting expansion off the secondary-ambient flow shear layer 34; and (2) compression waves necessary to turn the radially contracting secondary flow 30 and primary flow 32 in the axial direction. The compression wave near the core cowl trailing edge reflects alternately off the secondary and ambient flow shear layer 34 as an expansion wave and the primary-secondary shear layer 36 as a compression wave. This initial wave reflection pattern is reinforced in the flow turning region 38 above and immediately aft of the primary nozzle plug 20, thereby resulting in higher (shock cell) strength for the compression and expansion waves between the shear layers 34,36.

The common solution to the cabin noise problem is to add insulation to the aircraft. However, additional insulation adds significant weight which reduces fuel economy of the aircraft and also reduces passenger carrying capacity of the aircraft.

Accordingly, it is desirable to provide a turbo fan engine nacelle exhaust system which produces lower shock cell noise to the cabin without requiring additional sound insulation in the aircraft.

SUMMARY OF THE INVENTION

The present invention reduces shock cell noise produced by a turbo fan engine nacelle exhaust system by reducing shock strength of the engine exhaust. This is achieved primarily by providing the primary nozzle plug with a concave conical shape and by optimally designing the primary nozzle and fan nozzle aerodynamic lines.

More specifically, the present invention provides a turbo fan engine nacelle exhaust system including a contoured primary nozzle and a fan nozzle specifically positioned along a common central axis. The primary nozzle is bordered interiorly by a primary nozzle plug and bordered exteriorly by a primary nozzle sleeve. The fan nozzle is bordered interiorly by the core cowl and bordered exteriorly by a fan nozzle sleeve. The primary nozzle plug includes a generally cone shaped outer surface which is concave when viewed in side elevation. The concave outer surface has a radius of curvature $R_c$. The radius of curvature $R_c$ may be constant or variable, but it is continuous. The core cowl has a distal end which is radially spaced from the outer surface of the primary plug by a distance $\Delta H$ in a direction perpendicular to the central axis. The primary nozzle plug and core cowl define a ratio $R_c/\Delta H$ between approximately 14 and 18, thereby reducing shock associated noise of the turbo fan engine.

Preferably, the distal end of the core cowl has a core cowl radius $R_p$ with respect to the central axis, and a discharge end of the fan nozzle sleeve has a fan nozzle sleeve radius $R_f$, wherein a ratio $R_p/R_f$ is between approximately 0.4 and 0.6. Additionally, the outer surface of the primary plug nozzle is sloped at an angle $\phi_p$ between approximately 13° and 19° at the primary nozzle exit.

Objects, features and advantages of the invention are readily apparent from the following detailed description of the best mode for carrying out the invention when taken in connection with the accompanying drawings.

BRIEF DESCRIPTION OF DRAWINGS

FIG. 3 shows a schematic illustration of exhaust flow from a prior art turbo fan engine nacelle exhaust system;

FIG. 4 shows a schematic partial profile of a turbo fan engine nacelle exhaust system in accordance with the present invention illustrating exhaust flow therefrom;

DETAILED DESCRIPTION OF THE INVENTION

Figure 1:
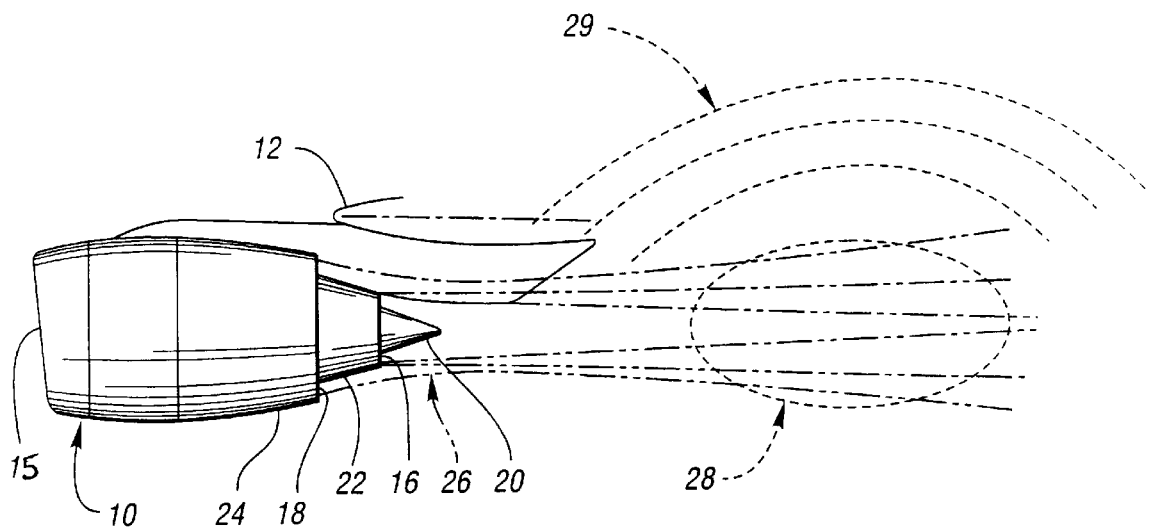
FIG. 1 shows a schematic side view of a prior art turbo fan engine nacelle exhaust system attached to the wing of an aircraft, illustrating a dominant shock cell noise producing region behind the engine.
Figure 2:
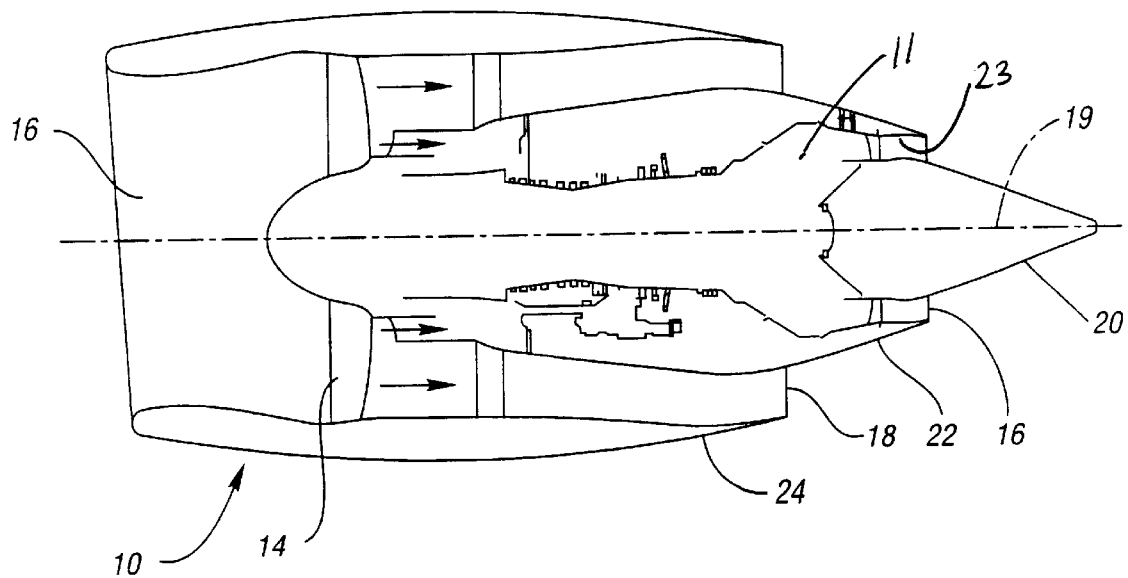
FIG. 2 shows a cross-sectional side elevation view of the prior art turbo fan engine nacelle exhaust system of FIG. 1.
Figure 5:
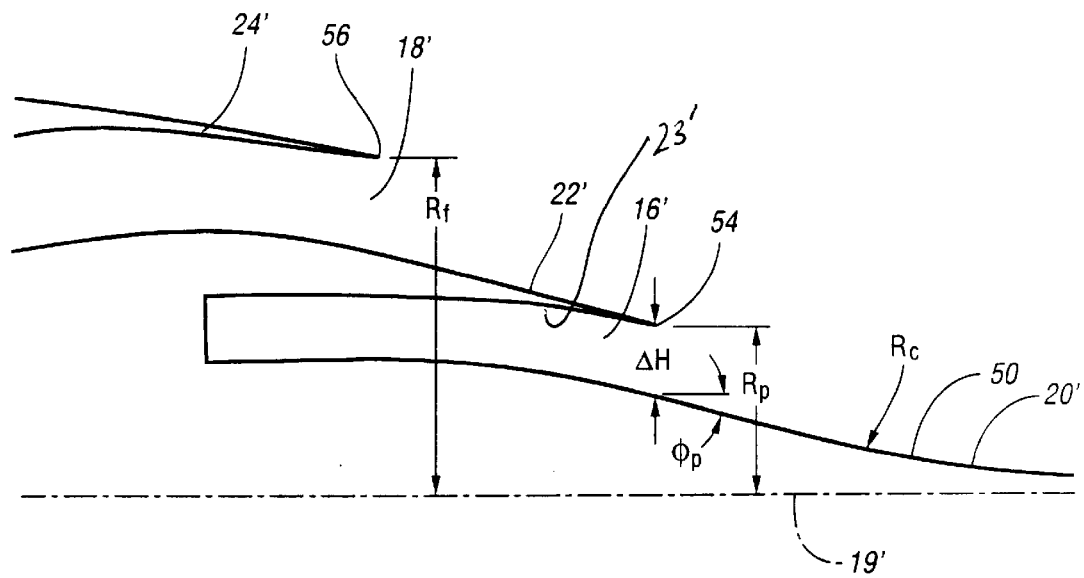
FIG. 5 shows a schematic partial profile of a turbo fan engine nacelle exhaust system in accordance with the present invention.

Referring to FIGS. 4 and 5, a schematic profile view of a turbo fan engine nacelle exhaust system is shown in accordance with the present invention. The turbo fan engine nacelle exhaust system is in most other respects similar to the prior art turbo fan engine nacelle exhaust system described above with reference to FIGS. 1–3, except the outer surface 50 of the primary nozzle plug 20' is concave when viewed in side elevation as shown in FIGS. 4 and 5, and the exit of primary nozzle 16' is specially placed relative to the exit of fan nozzle 18'.

The contoured or concave outer surface 50 of the primary nozzle plug 20' is designed to reduce the strength of the shock cell structure of the engine exhaust flow. First, a rapid expansion of the primary flow 32' immediately downstream of the exit of primary nozzle exit 16' is used to minimize the expansion wave reflection (as a compression wave) of the initial core cowl shock. This expansion occurs in the low pressure area 39'. Second, the extended concave region of the outer surface 50 of the primary nozzle plug 20' provides a wide high pressure region 41' in the primary flow 32' which produces a smooth turning of the secondary flow 30' with reduced or minimized compression wave formation. Accordingly, the flow turning region 38' has weak waves therein as a result of cancellation between expansion and compression waves which bounce between the shear layers 34',36'.

Figure 6:
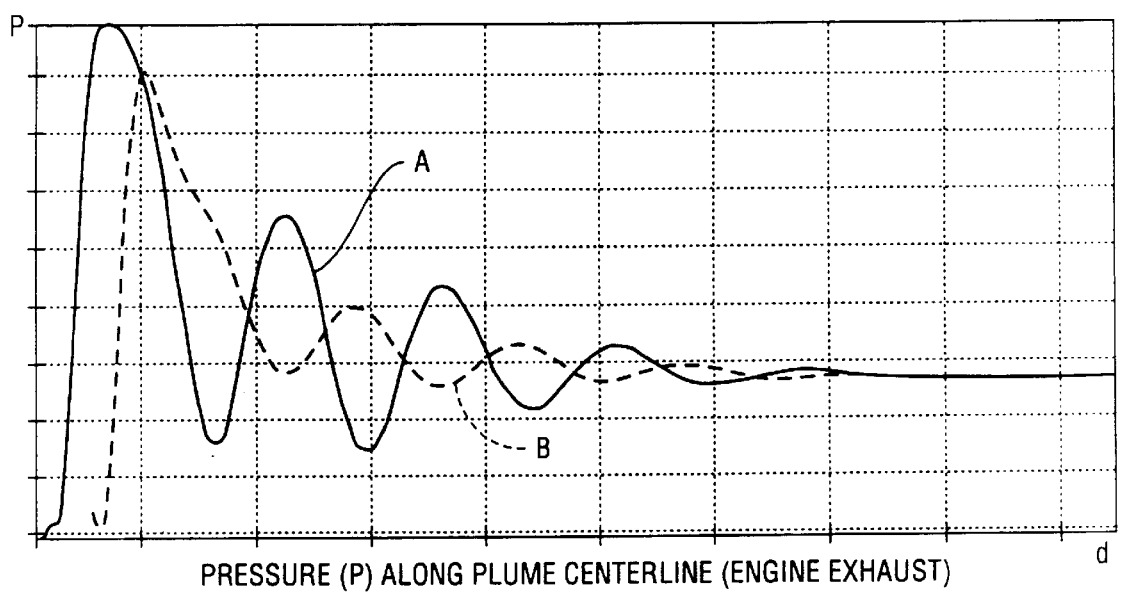
FIG. 6 shows a graphical illustration of flow pressure along the plume centerline vs. distance, comparing a prior art turbo fan engine nacelle exhaust system to the turbo fan engine nacelle exhaust system of the present invention.

These favorable flow interactions induced by the concave outer surface 50 of the primary nozzle plug 20' minimize the strength of the shock cell system from 2 to 5 fan nozzle diameters ($2R_f$) downstream of the primary nozzle 16'. This reduction of the shock cell strength reduces the shock associated noise of the engine exhaust. FIG. 6 schematically illustrates flow pressure along the plume centerline (corresponding with the central axis 19 shown in FIG. 2) versus the discharge distance, comparing a prior art design (A) to the turbo fan engine nacelle design of the present invention (B). As shown, with the present invention (B), amplitude of the pressure expansion and compression waves is substantially reduced in comparison to the amplitude of the pressure waves in a prior art turbo fan engine nacelle (A). The vertical axis of FIG. 6 is pressure P along the plume centerline, and the horizontal axis is discharge distance d.

Returning to FIG. 5, the present invention is particularly characterized by the specific dimensioning of the radius of curvature $R_c$ of the outer surface 50 of the primary nozzle plug 20', and also by specific placement of the primary nozzle exit 16' relative to the exit of fan nozzle exit 18'. As shown, the primary nozzle 16' is bordered interiorly by the primary nozzle plug 20' and bordered exteriorly by the primary nozzle sleeve 231. The fan nozzle 18' is bordered interiorly by the core cowl 22' and bordered exteriorly by the fan nozzle sleeve 24'.

The primary nozzle plug 20' includes the generally cone shaped outer surface 50 which is concave when viewed in side elevation to form the radius of curvature $R_c$, referenced above. The core cowl 22' has a distal end 54 which is radially spaced from the outer surface 50 of the primary nozzle plug 20' by a distance ΔH in a direction perpendicular to the central axis 19'.

Preferably, the primary nozzle plug 20' and core cowl 22' define a ratio $R_c/\Delta H$ between approximately 14 and 18, thereby reducing shock associated noise of the turbo fan engine.

The distal end 54 of the core cowl 22' has a core cowl radius $R_p$ with respect to the central axis 19'. A discharge end 56 of the fan nozzle sleeve 24' has a fan nozzle sleeve radius $R_f$, wherein the ratio $R_p/R_f$ is between approximately 0.4 and 0.6 to optimally size the primary nozzle 16' and fan nozzle 18'.

Additionally, referring to FIG. 5, the primary plug angle $\phi_p$ at the primary nozzle exit is preferably between 13° and 19°.

By way of example, in a preferred turbo fan engine nacelle design, $R_p$=15.4 inches, ΔH=6.5 inches, $R_c$=110 inches, $\phi_p$=17° and the axial distance between the distal end 54 of the core cowl 22' and the distal end of the primary nozzle plug is 38 inches. And in another preferred turbo fan engine nacelle design, $R_p$=28.6 inches, ΔH=9.4 inches, $R_c$=150 inches, $\phi_p$=15° and the axial distance between the distal end 54 of the core cowl 24' and the distal end of the primary nozzle plug 20' is 87 inches.

While an embodiment of the invention has been illustrated and described, it is not intended that such disclosure illustrate and describe all possible forms of the invention. It is intended that the following claims cover all modifications and alternative designs, and all equivalents, that fall within the spirit and scope of this invention.

What is claimed is:

1. A turbo fan engine nacelle exhaust system comprising:
 a primary nozzle and a fan nozzle positioned along a common central axis, the primary nozzle being bordered interiorly by a primary nozzle plug and bordered exteriorly by a primary nozzle sleeve, and the fan nozzle being bordered interiorly by a core cowl and bordered exteriorly by a fan nozzle sleeve;
 wherein the primary nozzle plug includes a generally cone-shaped outer surface which is concave when viewed in side elevation, the concave outer surface having a radius of curvature ($R_c$);
 wherein the core cowl has a distal end which is radially spaced from the outer surface of the primary plug by a distance (ΔH) in a direction perpendicular to the central axis; and
 wherein the primary nozzle plug and core cowl define a ratio $R_c/\Delta H$ between approximately 14 and 18, thereby reducing shock-associated noise of a turbo fan engine housed within the nacelle.

2. The turbo fan engine nacelle exhaust system of claim 1, wherein the distal end of the core cowl has a core cowl radius $R_p$ with respect to the central axis, and a discharge end of the fan nozzle sleeve has a fan nozzle sleeve radius $R_f$, wherein a ratio $R_p/R_f$ is between approximately 0.4 and 0.6.

3. The turbo fan engine nacelle exhaust system of claim 1, wherein the outer surface of the primary plug forms a primary plug angle $\phi_p$ between approximately 13° and 19° with respect to the central axis at the primary nozzle exit.

4. A turbo fan engine nacelle exhaust system comprising:
 a primary nozzle and a fan nozzle positioned along a common central axis, the primary nozzle being bordered interiorly by a primary nozzle plug and bordered exteriorly by a primary nozzle sleeve, and the fan nozzle being bordered interiorly by a core cowl and bordered exteriorly by a fan nozzle sleeve;
 wherein the primary nozzle plug includes a generally cone shaped outer surface which is concave when viewed in side elevation, the concave outer surface having a radius of curvature ($R_c$); and
 wherein a distal end of the core cowl has a core cowl radius $R_p$ with respect to the central axis, and a discharge end of the fan nozzle sleeve has a fan nozzle sleeve radius $R_f$, wherein a ratio $R_p/R_f$ is between approximately 0.4 and 0.6, thereby reducing shock associated noise of a turbo fan engine housed within the nacelle.

5. The turbo fan engine nacelle exhaust system of claim 4, wherein the distal end of the core cowl is radially spaced from the outer surface of the primary plug by a distance (ΔH) in a direction perpendicular to the central axis; and
 wherein the primary nozzle plug and core cowl define a ratio $R_c/\Delta H$ between approximately 14 and 18.

6. The turbo fan engine nacelle exhaust system of claim 5, wherein the outer surface of the primary plug forms a primary plug angle $\phi_p$ between approximately 13° and 19° with respect to the central axis at the primary nozzle.

7. A turbo fan engine nacelle exhaust system comprising:
 a primary nozzle and a fan nozzle positioned along a common central axis, the primary nozzle being bordered interiorly by a primary nozzle plug and bordered exteriorly by a primary nozzle sleeve, and the fan nozzle being bordered interiorly by a core cowl and bordered exteriorly by a fan nozzle sleeve;

wherein the primary nozzle plug includes a generally cone shaped outer surface which is concave when viewed in side elevation, the concave outer surface having a radius of curvature ($R_c$);

wherein the core cowl has a distal end which is radially spaced from the outer surface of the primary plug by a distance ($\Delta H$) in a direction perpendicular to the central axis;

wherein the primary nozzle plug and core cowl define a ratio $R_c/\Delta H$ between approximately 14 and 18;

wherein the distal end of the core cowl has a core cowl radius $R_p$ with respect to the central axis, and a discharge end of the fan nozzle sleeve has a fan nozzle radius $R_f$ with respect to the central axis, such that a ratio $R_p/R_f$ is between approximately 0.4 and 0.6, thereby reducing shock associated noise of a turbo fan engine housed within the nacelle.

8. The turbo fan engine nacelle exhaust system of claim 7, wherein the outer surface of the primary plug forms a primary plug angle $\phi_p$ between approximately 13° and 19° with respect to the central axis at the primary nozzle exit.

9. The turbo fan engine nacelle exhaust system of claim 7, wherein said radius of curvature ($R_c$) is constant.

10. The turbo fan engine nacelle exhaust system of claim 7, wherein said radius of curvature ($R_c$) is variable.

* * * * *